Feb. 8, 1955    R. C. FREVIK ET AL    2,701,733
ADJUSTABLE TOP LINK FOR TRACTORS
Filed May 5, 1952
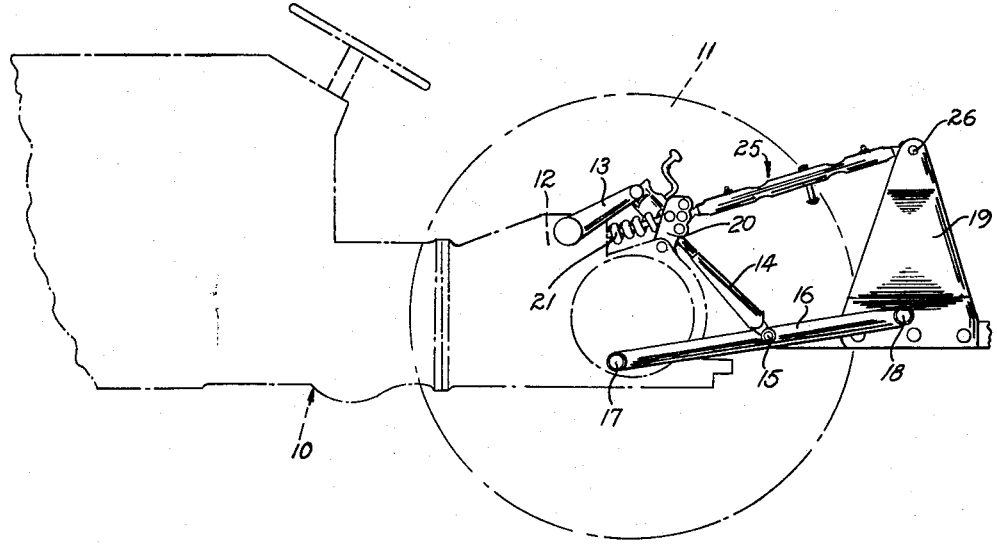
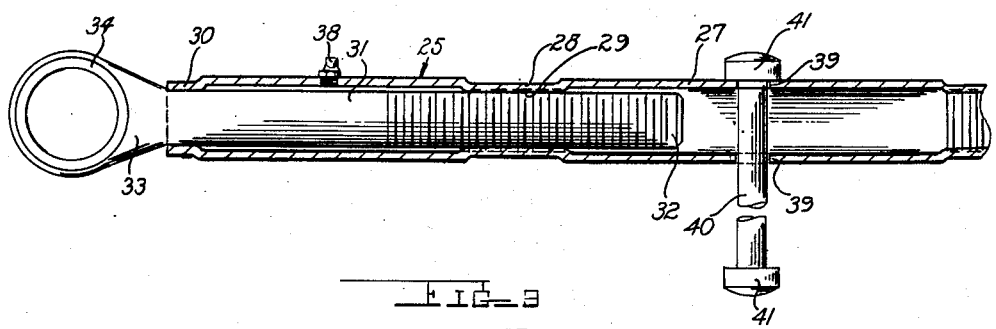
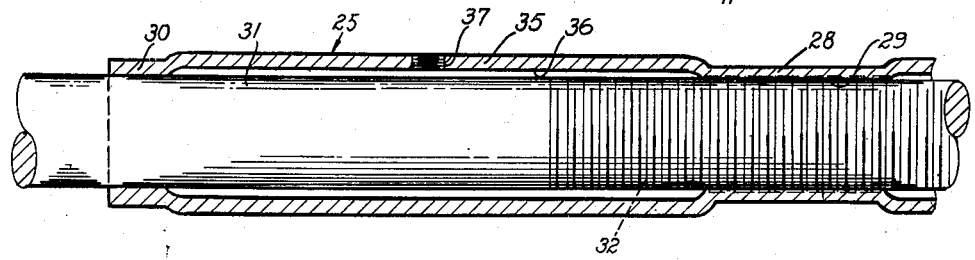
INVENTORS
RALPH C. FREVIK, WALTER W. SEWELL
& RAYMOND W. WILSON
BY
AND
ATTORNEYS

United States Patent Office 2,701,733
Patented Feb. 8, 1955

2,701,733

ADJUSTABLE TOP LINK FOR TRACTORS

Ralph C. Frevik, Detroit, Walter W. Sewell, Washington, and Raymond W. Wilson, Ferndale, Mich., assignors, by mesne assignments, to Ford Motor Company, Dearborn, Mich., a corporation of Delaware Application May 5, 1952, Serial No. 286,222

1 Claim. (Cl. 287—62)

The present invention relates to an adjustable link for tractors and more particularly to an adjustable top link adapted for employment with a tractor having three-point linkage for connection to a power liftable implement.

In certain well known types of tractors, such as the "Ford" tractor, implements are connected directly to a tractor through a tractor mounted, power liftable linkage. This linkage includes a pair of laterally spaced, power liftable draft links and a single top link located above and laterally intermediate the draft links. The top link serves to stabilize the implement against rotation about the points of implement attachment to the draft links and, in case of a grounding engaging implement, such as a plow, the top link is placed in compression by the tendency of the implement to rotate about its points of connection with the lower links.

During the operation of a plow, disc harrow or the like, the pitch of the implement, i. e., the angle of attack of the implement relative to the ground, can be altered by changing the effective length of the top link. The present invention provides an improved, inexpensive and readily adjustable top link wherein the length of the link is threadedly adjustable from the tractor seat to make possible changes in the pitch of an implement while the implement is in operating position. More particularly, the top link of the present invention comprises a tubular housing and a pair of separate, oppositely threaded link ends threadedly retained within the housing and relatively adjustable axially therein. The link ends are attachable to the tractor and the implement, respectively, and so are held against rotation, while rotation of the housing effects simultaneous telescopic adjustment of the link ends within the housing, so that the effective length of the link is varied.

It is, therefore, an important object of the present invention to provide an improved, inexpensive, and easily adjustable top link for a tractor.

Another object is the provision of a top link wherein the link length is adjustable manually by relative threaded adjustment between a housing and a pair of threaded link ends.

It is a further object to provide a top link for a tractor including a tubular housing having spaced interiorly threaded portions threadedly receiving corresponding portions of a pair of link ends respectively, the housing defining an interior lubricant chamber immediately adjacent each of the threaded portions thereof for retaining a body of lubricant.

Still another important object is the provision of a top link having a tubular body at least one end of which is provided with a reduced portion interiorly threaded to matingly receive a corresponding end of an attachment member and also having a second reduced portion spaced from the interior threads to define a lubricant chamber therebetween.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a fragmentary side elevational view of a tractor (shown in phantom) and an implement attached to the tractor by an implement linkage, including a top link of the present invention;

Figure 2 is an enlarged fragmentary axial sectional view, with parts shown in elevation, of the top link of the present invention; and Figure 3 is a greatly enlarged fragmentary sectional view similar to Figure 2 and illustrating the link of Figure 2 in greater detail.

As shown on the drawings:

In Figure 1 reference numeral 10 refers generally to a tractor of well known make, such as a "Ford" tractor, having a pair of rear driving wheels 11 joined by an axle enclosed within a rear axle housing 12.

The rear axle housing 12 is surmounted by a pair of laterally spaced pivoted rock arms 13 adapted to be actuated for arcuate lifting movement by the conventional tractor hydraulic system and connected at their free rear ends to depending lift arms 14. The lift arms are each pivotally connected, as at 15, to a medial portion of a draft link 16 which is pivotally connected at its forward end, as at 17, to the underside of the rear axle housing 12, and which is adapted for pivotal connection at its rear end, as at 18, to an implement 19.

Also on top of the rear axle housing and immediately rearwardly of the rock arms 13, there is located a pivoted reaction arm 20 urged rearwardly by a control spring 21 of the tractor hydraulic system, as is well known in the art. The arm 20 is pivotally connected to a rearwardly extending top link 25 of the present invention, the link 25 being pivotally connected as at 26 to the upper end of the A-frame of the implement 19.

As best illustrated in Figures 2 and 3, the top link 25 comprises a generally tubular body 27 having spaced inwardly deformed portions 28, with the inner periphery 29 being threaded for a purpose hereinafter to be more fully described. Each of the terminal ends of the body portion 27 is also inwardly deformed as at 30, with the inner diameter of the deformed portion 30 being slightly smaller than the root diameter of the threads 29 of the portions 28. The portions 28 and 29 may be inwardly deformed and sized by an appropriate forming method or operation. For example, the portions 28 and 30 may be swaged inwardly by a die operation, or the portions 28 and 30 may be rolled to the desired diameter.

The open opposite ends of the tubular body 27 are each adapted to receive a link end which comprises simply an elongated rod 31 of a length substantially less than half the length of the body 27 and provided with exterior peripheral threads 32 matingly engageable with the interior threads 29 of the body portions 28. Each rod bears at its free outer end, an enlarged embossment 33 within which is freely journaled a segmental spherical attachment bearing 34 of well known type.

It will be noted, particularly in Figure 3, that the portion 35 of the housing 27 lying between the portions 28 and 30 cooperates with the rod 31 to define an interior annular chamber 36, which surrounds the rod, and which is placed immediately adjacent the mating threads 29 and 32. Access to the chamber 36 is provided by a radial interiorly threaded aperture 37 within which is seated a grease fitting 38. The chamber 36, often being packed with grease or other lubricant, serves as a reservoir for storing lubricant for the threads, and it will be appreciated that upon telescoping threaded movement of the rod 31 within the housing 27, that the threads will be lubricated by their passage into and through the chamber 36.

The operation of the link to adjust the length thereof will be readily understood, since the attachment bearings 34 of the rods 31 are held against rotation by their pivoted attachment to the tractor and the implement, respectively. Relative rotation of the housing 27 and the rods 31 can be accomplished by manually rotating the housing and the opposite threads on the rods will effect telescopic movement of the rods within the housing to lengthen or shorten the link, depending upon the direction of rotation of the housing.

To facilitate rotation of the housing, the center of tubular housing 27 may be provided with a pair of diametrically opposed, registerable apertures 39, through which extend a handle rod 40, freely movable through the apertures and having terminal enlarged ends 41, which are not enterable through the apertures. The rod 40 serves as a handle for rotating the housing upon the rods so as to obtain threaded adjustment of the overall length of the link, i. e., between the two segmental spherical bearings 34. The rod handle 40 also serves as a lock for retaining the tubular body 27 in a given position since, for the tubular body to unwind itself upon the threaded rods, the overcenter handle must be moved through an angle of greater than 90° so it can slip through the apertures to depend therefrom on the other side of the housing. Thus, the unbalanced weight of the rod 40 projecting through the apertures 39 provides a gravity lock.

Thus, it will be appreciated that the present invention provides an improved adjustable top link construction which is extremely simple in construction and operation, which is economical to manufacture, and which provides for the positive threaded adjustment of the link length, while at the same time being provided with a gravity lock for retaining the link at any adjusted length thereof.

It will, of course, be understood that various details of construction may be varied through a wide range without departing from the principles of this invention and it is, therefore, not the purpose to limit the patent granted hereon otherwise than necessitated by the scope of the appended claim.

We claim:

A top link for connecting an implement to a tractor comprising a tubular body having axially spaced radially reduced portions provided with interior threads intermediate the length thereof and terminal radially reduced portions axially spaced from the threaded reduced portions, a separate exteriorly threaded rod projecting axially into each end of said body, respectively, to project through said reduced portions, the portions on said body lying between said reduced portions defining annular lubricant chambers in full communication with said rods immediately adjacent the rod threads and said terminal reduced portions supporting said rods, respectively, in axially spaced relation to the threads thereof to resist bending of said rods and cramping of said rod threads in said interior body threads, bearing means on the ends of said rods projecting axially beyond said body portion, and means for accommodating the introduction of lubricant into said annular chamber.

References Cited in the file of this patent

UNITED STATES PATENTS

| | | |
|---|---|---|
| 742,821 | Blake | Oct. 27, 1903 |
| 842,770 | Connelly | Jan. 29, 1907 |
| 1,134,347 | Peterson | Apr. 6, 1915 |
| 1,359,391 | Landymore et al. | Nov. 16, 1920 |

FOREIGN PATENTS

| | | |
|---|---|---|
| 687,843 | France | Aug. 13, 1930 |